United States Patent [19]

Koshy

[11] Patent Number: 4,647,749
[45] Date of Patent: Mar. 3, 1987

[54] APPARATUS AND METHOD FOR WELD CLADDING CYLINDRICAL OBJECTS

[75] Inventor: Philip Koshy, Sugar Land, Tex.

[73] Assignee: Joy Manufacturing Company, Pittsburgh, Pa.

[21] Appl. No.: 692,431

[22] Filed: Jan. 17, 1985

[51] Int. Cl.⁴ .............................................. B23K 9/04
[52] U.S. Cl. ........................... 219/76.14; 219/125.12; 137/375
[58] Field of Search ............... 219/76.1, 76.14, 76.12, 219/125.11, 125.12

[56] References Cited

U.S. PATENT DOCUMENTS

| 4,149,061 | 4/1979 | Mort et al. | 219/125.11 X |
| 4,242,981 | 6/1981 | Bernard et al. | 219/76.1 X |
| 4,471,201 | 9/1984 | Hardy | 219/76.14 |
| 4,527,039 | 7/1985 | Füwesi | 219/76.1 X |

FOREIGN PATENT DOCUMENTS

| 140432 | 3/1980 | German Democratic Rep. | 219/125.12 |
| 63138 | 5/1977 | Japan | 219/125.11 |
| 988490 | 1/1983 | U.S.S.R. | 219/76.1 |

Primary Examiner—Harold Broome
Assistant Examiner—C. M. Sigda
Attorney, Agent, or Firm—Marvin J. Marnock

[57] ABSTRACT

Apparatus and method for depositing a corrosion resistant weld clad material upon a cylindrical surface of a workpiece such as the internal cylindrical conduit of a valve body (10). The apparatus includes a turntable (12) having a rotating platform (24) which is adapted for supporting the valve body for rotation about the cylindrical axis of its internal conduit (14). The platform (24) can be tilted from a horizontal position through to a vertical position such that the central axis of the valve body conduit connected thereto can be angled between 30 and 60 degrees. A wire-fed, gas-shielded welding torch (16) is supported adjacent to the cylindrical surface of the conduit (14) to be coated such that as the valve body (10) is rotated by the turntable (12), weld material (82) is deposited circumferentially about the surface of the conduit. The welding torch includes an oscillating mechanism (20) for providing linear horizontal movement of the welding torch head (18) in the generally axial direction of the conduit to provide the desired weld bead configuration and characteristics. Lastly, the welding torch is provided with carriage means (22) for incrementally moving the welding head (18) axially within the conduit in response to each complete rotation of the valve body. In this manner the apparatus and method disclosed herein will cover the entire surface to be welded with a corrosion resistant weld clad material to protect the base material and, therefore, the internal integrity of the valve body.

16 Claims, 7 Drawing Figures

APPARATUS AND METHOD FOR WELD CLADDING CYLINDRICAL OBJECTS

BACKGROUND OF THE INVENTION

The invention relates to an apparatus and method for weld cladding of metallic cylindrical workpieces and, in particular, to the weld cladding of the cylindrical fluid flow conduit of a valve body. The conduit is held at an angle with respect to the normal horizontal and vertical planes during the welding process to improve weld bead configuration.

As is known, it is often necessary to plate or clad the interior or exterior surfaces of metal components to improve the wearability of such components or to improve the corrosion resistant properties thereof. Commonly, a welding apparatus is utilized to provide the plating or cladding by depositing a weld material on the surface of the workpiece such as a valve body and then machining the welded area to the proper shape to provide a smooth surface to improve wearability or corrosion resistant characteristics of the fluid flow pathway.

There are several different types of welding processes each with its own set of advantages and disadvantages. The present invention utilizes a gas metal arc welding (GMAW) technique or actually a variation thereof called short circuiting arc welding (short arc). GMAW is an electric arc welding process which produces coalescence of metals by heating them with an arc established between a continuous filler metal electrode (consumable) and the workpiece. Shielding of the arc and molten weld bead is obtained entirely from an externally supplied gas or gas mixture. GMAW short arc welding uses the lowest range of welding current and electrode diameters associated with GMAW.

In utilizing the short arc GMAW technique it is important to control the dilution percentage of the weld bead to base metal which is defined as the amount of filler material penetrating into the base metal material divided by the total amount of filler material deposited on the surface to be welded. As the dilution percentage increases the amount of base metal imperfections drawn into the weld bead increases which can destroy the effectiveness of the corrosion resistant layer of weld material.

Prior art apparatus and methods utilizing short arc welding and GMAW techniques are not particularly new in the industry. Each of U.S. Pat. Nos. 4,215,809, issued Aug. 5, 1980 to Davis, and 4,242,981, issued Jan. 6, 1981 to Bernard et al, show an apparatus utilizing such welding processes. The prior art apparatus includes a mandrel adapted for supporting a cylindrical workpiece for rotation about its longitudinal axis. A wire-fed welding torch is supported adjacent to the interior surface of the workpiece such that as it is rotated by the mandrel welding material is deposited circumferentially about the interior surface thereof. The torch is supported for longitudinal movement with respect to the workpiece in response to the rotation thereof until the welding material is deposited over the entire interior surface. However, with these apparatus it is difficult to control the weld bead tie-ins which is the manner in which one bead fuses with its adjacent weld bead and oftentimes gaps appear between weld beads thereby destroying the effectiveness of the corrosion resistant cladding. The dilution levels between the weld bead and base material is also hard to control and, therefore, it is frequently necessary to weld two layers of cladding, one on top of the other, over the entire surface to be welded to obtain a solid machinable layer of weld material.

SUMMARY OF THE INVENTION

It is accordingly an object of the present invention to provide an apparatus and method that overcome the shortcomings of the prior art. More particularly, it is a primary object of the present invention to provide a method and apparatus for applying a layer of weld cladding to a cylindrical surface having a constant radius in a single pass while maintaining low levels of dilution with the base material.

A further object of the present invention is to provide a welding apparatus and method which allows a layer of corrosion resistant material to be deposited uniformly over a cylindrical surface in a single welding pass while maintaining a proper weld bead tie-in and a low dilution level of 4% or lower with the base material.

A still further object of the present invention is to provide a welding apparatus and method whereby relative rotational motion between the welding head and workpiece to be welded is effected through rotation of a turntable holding the workpiece such that the turntable positions the central axis of the workpiece in a tilted relationship relative to the normal horizontal and vertical planes to improve the weld bead tie-in and better control the dilution levels of the weld material to the base material while maintaining an effective single pass weld clad layer.

Briefly stated, the foregoing and other objects of the present invention are accomplished by providing an apparatus and method for depositing a weld material upon a cylindrical surface of a workpiece such as the interior fluid flow conduit of a valve body by means of an oscillating gas-shielded consumable electrode. The apparatus includes a turntable adapted for supporting a cylindrical workpiece for rotation about its cylindrical axis. The rotating turntable is capable of being tilted such that the cylindrical axis of the workpiece can be tilted relative to the normal horizontal and vertical planes while being rotated. A wire-fed, gas-shielded welding torch is supported adjacent to the surface of the workpiece such that as the workpiece is rotated by the turntable, weld material is deposited circumferentially about the surface to be welded. The welding torch includes an oscillating mechanism for providing linear movement of the head of the welding torch which is positioned adjacent the surface to be welded. The oscillating mechanism oscillates the welding head within a horizontal plane in a generally axial direction relative to the cylindrical axis of the valve body conduit to provide the desired weld bead configuration, tie-in and dilution levels with the base material.

Additionally, the welding torch is provided with carriage means for incremental longitudinal movement with respect to the cylindrical axis of the workpiece in response to each complete rotation thereof such that weld material will cover the entire surface to be welded in both the axial and circumferential directions.

The method comprises the steps of rotating a cylindrical workpiece about its cylindrical axis, tilting the rotating workpiece such that its cylindrical axis is angled with respect to the normal horizontal and vertical planes, positioning a welding torch adjacent the surface to be welded such that as the workpiece is rotated, weld material is deposited circumferentially about the cylindrical surface to be welded. Then, oscillating the welding head adjacent the surface to be welded to spread the weld material over a uniform depth and distance, and incrementally moving the welding torch axially with respect to the workpiece in response to each complete rotation of the workpiece such that weld material will cover the entire surface to be welded. The method thus provides a weld bead which is capable of being deposited in a single pass while maintaining adequate weld depth, tie-in and dilution levels.

These together with other objects and advantages which will become subsequently apparent reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENT

Figures 1, 4:
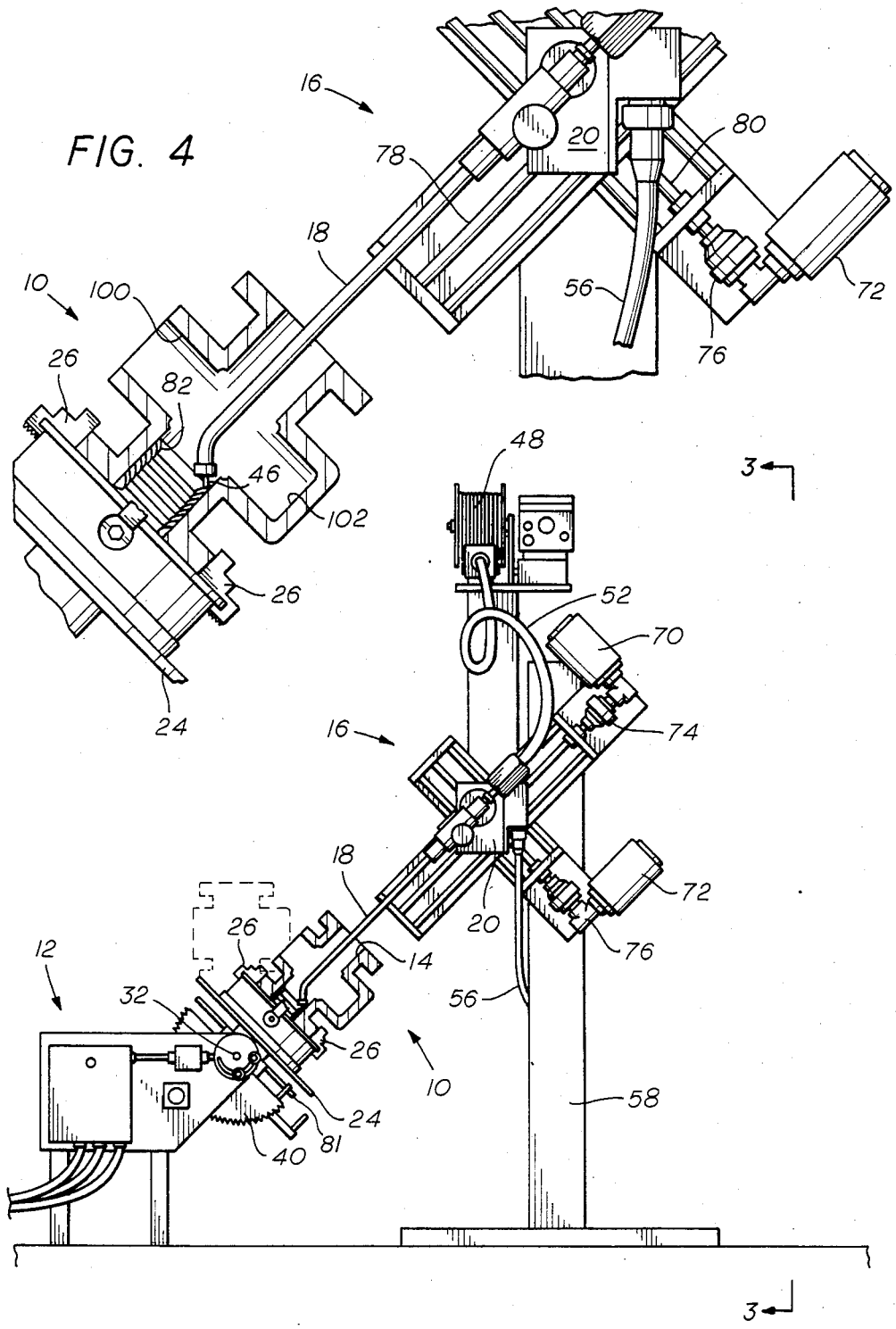
FIG. 1 is a side elevational view of the welding apparatus of the present invention shown in operation on a valve body shown in cross-section and having a cylindrical bore.
FIG. 4 is a side elevational, part sectional view taken substantially along a plane passing through section line 4—4 of FIG. 2 and showing the relation of the welding tip to the cylindrical bore of the valve body.

Referring now to the drawings and specifically FIGS. 1-4, the apparatus of the present invention is adapted for depositing weld material on the surface of a cylindrical workpiece 10. The drawings of the preferred embodiment illustrate a valve body having a cylindrical conduit therethrough as an example of such a workpiece. However, the apparatus and method disclosed herein will deposit weld material on any cylindrical surface having a constant radius and, therefore, its application is not specifically limited to use on a valve body.

Briefly, the welding apparatus includes four major components. A turntable 12 for supporting valve body 10 for rotation about the longitudinal axis of the conduit 14 extending through said valve body. An arc welder 16 provides current and weld material to welding head 18 which can be inserted into conduit 14 to deposit weld material thereon. An oscillator 20 is attached to welding head 18 to impart an oscillating movement in a generally axial direction relative to the welding head 18. A carriage 22 carries the oscillator 20 and welding head 18 and functions to incrementally move the welding head 18 axially within conduit 14.

The turntable 12 has a revolving platform 24 having in the preferred embodiment four jaws 26 of conventional design for engaging flanged ends of valve body 10. Jaws 26 are contained within slots 28 in platform 24 so as to be movable radially with respect thereto in order to accommodate varying flange diameters to secure the valve body 10 thereto for rotation about the cylindrical axis of its conduit 14.

The revolving platform 24 is supported for rotation by a shaft (not shown) which is rotatbly connected to a cross-shaft 32. The cross-shaft 32 is connected on one end to a conventional endless chain and sprocket arrangement (not shown) enclosed within protective cover 34. A variable speed motor 36 is supported within turntable 12 and is connected to the chain and sprocket arrangement through a gearbox 38 to provide rotation of the cross-shaft 32, shaft 30, and platform 24. In actual practice, the motor speed and gear ratios are chosen such that the platform speed may be varied from about one to twenty revolutions per minute which speeds constitute the preferred operation angular velocity range for the revolving platform 24.

Figure 2:
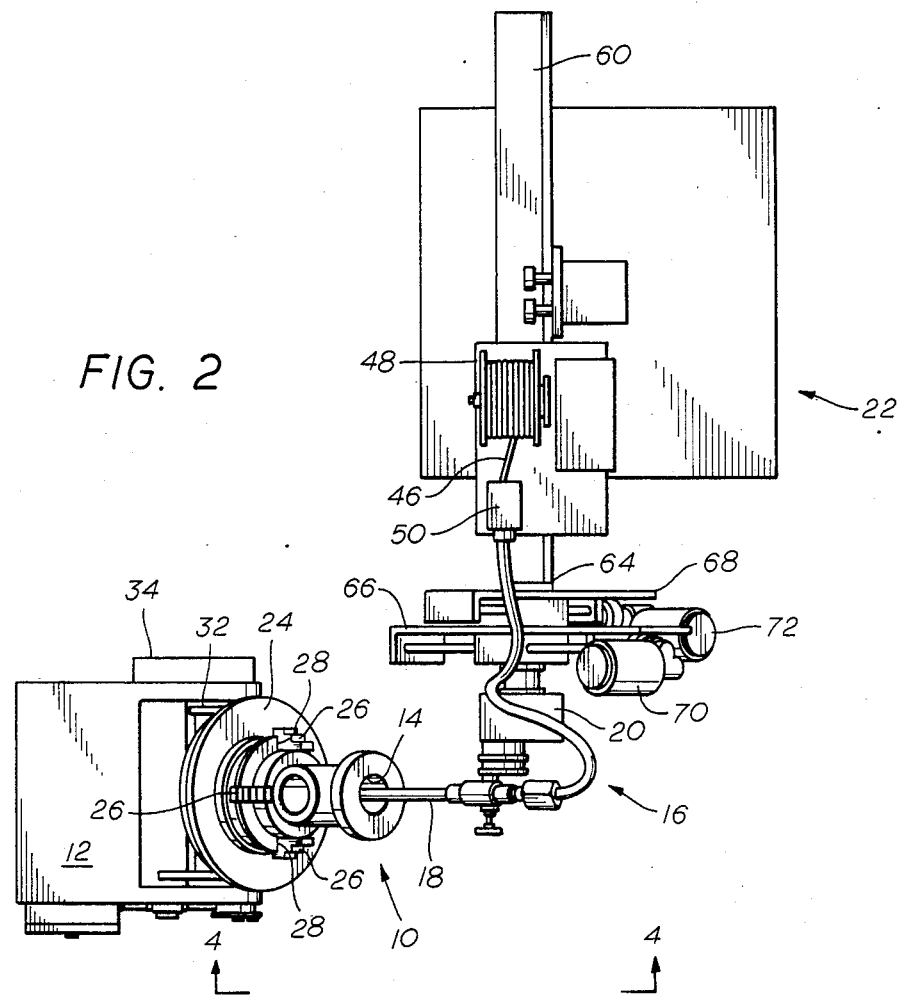
FIG. 2 is a top view of the welding apparatus of the present invention shown in operation.
Figure 3:
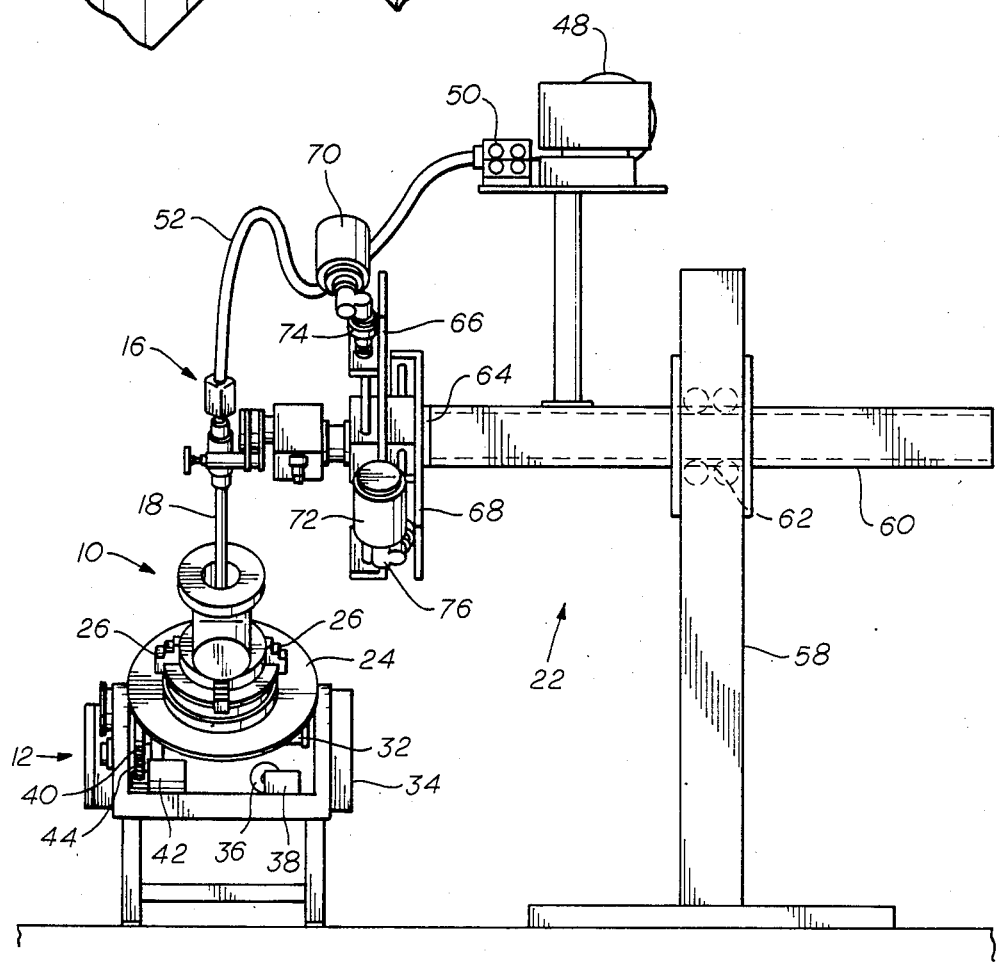
FIG. 3 is an end view of the welding apparatus of the present invention taken along a plane passing through line 3—3 of FIG. 1.

It is also possible to tilt or angle the platform 24 with respect to the normal horizontal and vertical planes as shown in FIGS. 1-3. The platform 24 can be tilted about the central axis of the cross-shaft 32. The second end of the cross-shaft has a sector gear 40 positioned thereon as shown in FIG. 1. An electric motor 42 is supported within the turntable 12 and is connected to a worm gear 44 which engages the sector gear 40 for tilting the top of the platform 24 from a normally horizontal position to an angled position relative to the normal horizontal and vertical planes a shown in FIG. 3. This turntable is well known in the welding art and is conventionally called a positioner. An important feature of the present invention is the utilization of an apparatus which can support the valve body 10 for rotation about the central axis of the conduit 14 where the central axis is angled relating to the normal horizontal and vertical planes so that the force of gravity will assist in the development of a proper weld bead geometry. The optimal angle of tilt of the central axis of the conduit 14 with respect to the horizontal plane is 45 degrees. However, it has been determined that a good weld bead geometry can be be obtained with the central axis of conduit 14 supported at angles between 30 and 60 degrees with respect to the horizontal plane.

The arc welder 16 has a welding electrodes 46 which is coiled upon spool 48 and is fed through feed mechanism 50 into tubing 52 and into welding head 18. Arc welder 16 is an amperage controlled device which automatically feeds the proper amount of welding electrodes based on the amperage selected. The higher the amperage or current that flows through the electrode 46, the greater will be the rate of deposit. However, higher currents create more heat and increase penetration of the weld bead into the base metal which increases dilution. Therefore, it is important to minimize the current levels to control the dilution levels and minimize the heat generated within the conduit 14. Furthermore, the arc welder may be provided with any other conventional welding features. For instance, in automatic consumable electrode welding such as this, it is common to provide an inert gas atmosphere about the electrode being consumed. The channeling of this gas normally takes place through welding head 18, but has been omitted here for purpose of simplicity.

As shown in the preferred embodiment, the electrode is made out of Inconel 625 with less than 1% iron which provides an excellent corrosive resistant clad surface.

Furthermore, such a material also allows overall dilution levels of less than or equal to four (4) % with respect to the base material which is made of mostly iron. However, there exists many other metal substances which can be used in place of the Inconel 625 which also provide a corrosive resistant cladding or allow rebuilding of the cylindrical metal surfaces.

The welding head 18 is supported adjacent the interior surface of the cylindrical conduit 14 by carriage 22. An oscillator 20 is positioned between welding head 18 and the carriage 22. The oscillator 20 imparts an alternating movement of the welding head 18 in a generally axial direction of the conduit 14. The oscillator 20 can be powered either hydraulically or pneumatically through hose 56 (fluid power source not shown).

The oscillator 20 and welding head 18 are supported by carriage 22. Carriage 22 includes a generally vertical stand segment 58 and a generally horizontal cross arm segment 60 connected by a motorized segment 62. The motorized segment 62 provides both vertical and horizontal movement to the cross arm segment 60. In operation the carriage 22 is set next to the turntable 12 such that the longitudinal axis of cross arm segment 60 is perpendicular to the cylindrical axis of the conduit 14 and platform 24. The end 64 of cross arm segment 60 closest to turntable 12 as shown in FIG. 3 is rotatably connected to a pair of motorized carriage arms 66 and 68 with longitudinal axes fixed 90 degrees apart. One carriage arm 66 is normally aligned with its longitudinal axis in parallel with the cylindrical axes of the conduit 14 of valve body 10 while the axis of the other carriage arm 68 is normally positioned perpendicular thereto. Each carriage arm 66 and 68 has respective electric motors 70 and 72, gear boxes 74 and 76, and screw rods 78 and 80. The oscillator 20 and welding head 18 are connected directly to the screw rods 78 and 80 of the carriage arms 66 and 68 such that upon electrical impulse generated to the electric motors 70 and 72 the separate screw rods 78 and 80 are activated to move the welding head 18 in the respective axial direction of the screw rods.

Switching means 81 is provided on the turntable 12 such that after each complete 360 degree rotation of the platform 24 an impulse is communicated to electric motor 70 of carriage arm 66 to activate gear box 74 and rotate screw rod 78 to incrementally move the welding head 18 axially within the conduit 14 of valve body 10. Typically, as can be more readily seen in FIG. 4, the welding head will be moved a distance of approximately ⅛ inch or a suitable distance approxiamtely equal to the width of the weld bead being produced. In this manner the welding apparatus can be utilized to clad or resurface the entire area within conduit 14 of valve body 10.

Figure 5:
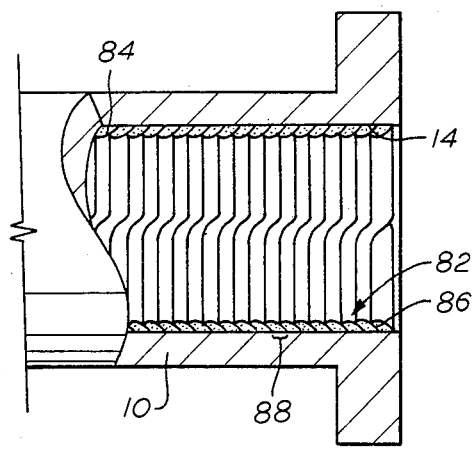
FIG. 5 is a sectional view showing a completed continuous weld as produced by the welding apparatus, particularly illustrating the geometric configuration of the improved weld bead.
Figure 6:
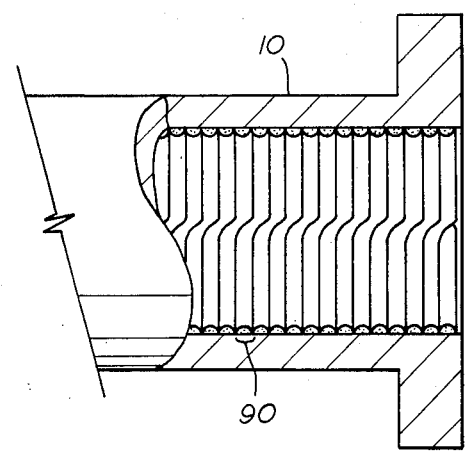
FIG. 6 is a sectional view of a completed continuous weld according to prior part methods.

The present invention provides a weld bead 82 having a predetermined geometry as shown in FIG. 5. Since the conduit 14 of valve body 10 is angled 45 degrees with respect to the horizontal plane, the force of gravity works to skew the molten material forming the weld bead 82 in a downward direction such that the greater density of material of the bead forms on the downward or downhill side 84 of the sloped conduit 14. The desired weld bead geometry is one where a greater amount of density of weld bead material is formed on the downhill side 84 of weld bead 86 than is formed on the uphill side of weld bead 86. The oscillator 20 imparts a reciprocating horizontal movement to the welding head 18 which spreads out the weld bead such that a generally horizontal surface is formed by the weld material on the uphill side of the weld bead 82. Once the platform 24 makes a complete 360 degree rotation the welding head 18 is moved an incremental distance as discussed above to begin a new 360 degree rotation of the platform 24 and workpiece 10. The weld bead tie-in is improved because each successive weld bead 86 is laid for the most part on the earlier weld bead as shown in FIG. 5 which prevents gaps from appearing between weld beads as can occur in the prior art weld beads as seen in FIG. 6. The dilution level of weld material to the base material in the present invention is kept to a minimum because only a small incremental portion of base material 88 is welded upon at any one time (approximately ⅛ inch). Compare the prior art method shown in FIG. 6 where the full bead 90 contacts the base material thereby allowing impurities of the base metal to be more readily absorbed by the weld material. Therefore, it is seen that the weld bead 82 shown in FIG. 5 provides an improved weld bead geometry over the prior art. The weld bead of the present invention can be applied in a single pass and combines the characteristics of a good weld bead tie-in and a low dilution level of weld material to the base material.

In order to properly weld clad a cylindrical workpiece such as the interior conduit of a valve body 10, the following steps are carried out. First, a valve body 10 having a conduit 14 therethrough is positioned upon the turntable 12 and is rotated about the central axis of its conduit. The platform 24 of turntable 12 is tilted with respect to the normal horizontal and vertical planes such that the central axis of the rotating valve body conduit 14 is positioned at an angle between 30 and 60 degrees from said normal planes. The optimal angle of tilt is 45 degrees. A further step is positioning an electric arc welding torch adjacent the rotating cylindrical surface to be welded. The welding torch having an oscillator 20 connected thereto to provide the welding head 18 with a back and forth movement to spread out the weld bead 86 during the welding process. It is important that the welding head 18 be horizontally oscillated in the axial direction with respect to the angled surface being welded so that the proper weld bead geometry as shown in FIG. 5 can be obtained. The last step is to incrementally move the welding head 18 axially of the conduit 14 in response to each complete rotation of the valve body 10 so that weld clad material will cover the entire surface to be welded. The incremental distance moved by the welding head 18 must be strictly controlled to maintain the proper weld bead geometry, tie-in and dilution levels with the base material.

Figure 7:
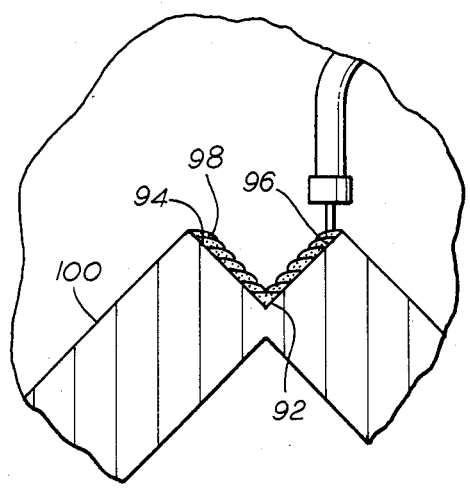
FIG. 7 is an enlarged sectional view illustrating the method of depositing a continuous weld bead within the seat pockets of a valve body.

Referring to FIG. 7, it is shown how the optional 45 degree angle of tilt of the platform 24 works to the manufacturer's advantage in not only improving the weld bead geometry, but also in saving manufacturing set-up time resulting in real cost savings. Most valve bodies 10 have seat pockets 92 which define surfaces 94 and 96 designed to receive annular valve seats (not shown). Said surfaces 94 and 96 are typically 90 degrees offset such that if the valve body 10 and its conduit 14 are held on a 45 degree tilt with respect to normal horizontal and vertical planes, each of said surfaces 94 and 96 lie in a 45 degree relationship to those normal planes. Therefore, the present invention may be utilized without any change in set up of the welding apparatus to deposit weld material 98 on both of said surfaces. The weld beads on both surfaces 94 and 96 will maintain the proper weld bead geometry tie-in, and low dilution levels with the base material.

Furthermore, it can be seen in FIG. 4 that it would be desirable to deposit weld material on the cross-conduit 100 provided in weld body 10. To perform this function the valve body is released from platform 24 and resecured thereto with the closed end 102 of valve body 10 contacting the platform 24. It is necessary to align the central axes of the cross-conduit 100 with the axes of the platform 24 such that upon rotation of platform 24 the valve body 10 will revolve about the cross-conduit axis. Then, the welding apparatus is inserted therein and weld material is deposited within the cross-conduit 100 in the same manner as described above until the entire cylindrical surface to be welded is completed.

It may thus be seen that the apparatus and method of the present invention enables one to apply a single pass corrosion resistant layer of weld material to the surface of a cylindrical object having a constant radius while maintaining a quality weld bead tie-in and a low dilution level with the base material.

Of course, further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features may be utilized independently of the use of other features, all as would be apparent to one skilled in the art after having the benefit of this description of the invention.

What is claimed is:

1. An electrical welding apparatus for applying a contiguous coaxial weld bead to a cylindrical surface of a generally cylindrical workpiece having a central axis which comprises:

a turntable having a revolving platform with an axis of rotation and a pivot axis for tilting the platform from a horizontal position through to a vertical position;

gripper means on the revolving platform for supporting the cylindrical workpiece surface coaxially with the axis of rotation of the platform for rotation therewith, the platform being tiltable about its pivot axis such that the central axis of the cylindrical workpiece surface is angled with respect to the horizontal position of the platform;

a wire-electrode fed welding torch positionable adjacent to the cylindrical workpiece surface for applying a consumable wire electrode onto said surface in the form of a weld bead as the workpiece rotates, said welding torch including an elongated welding head which is positionable adjacent the workpiece surface to be welded, supply means for providing the welding head with a supply of wire electrode, and a power source to create an electric arc between the wire electrode and workpiece surface, the weld bead produced on said surface by said apparatus being skewed in a downwardly angled direction of the workpiece surface by the force of gravity acting on the weld bead such that a greater density of weld bead material is formed on a downward side of the weld bead then is formed on an upward side of the weld bead;

oscillating means mountable to the welding head of said torch for oscillating the welding head in a horizontally reciprocating linear movement in a generally axial direction of the cylindrical surface to be coated such that a weld bead is produced having a generally horizontal surface portion formed on the upward side of the weld bead; and carriage means for supporting said welding torch and incrementally moving the welding head axially with respect to the cylindrical workpiece surface in response to a complete rotation of the platform of said turntable until a continuous coaxial weld bead is applied over the entire cylindrical surface to be welded.

2. The welding apparatus as recited in claim 1, further comprising;

the carriage means including a slide mechanism connected to said welding torch and being adapted to enable the angle of the elongated welding head to match the angle of the tilted axis of the workpiece and electric means for moving said welding torch axially with respect to the cylindrical surface to be coated; and switch means for energizing the electric moving means in response to one revolution of the platform to incrementally move said welding torch.

3. The welding apparatus as recited in claim 1, further comprising gas-shielding the electric arc produced by said welding torch.

4. The welding apparatus as recited in claim 3, further comprising means for varying the rate of delivery of gas to said means gas shielding.

5. The welding apparatus as recited in claim 1, further comprising means for varying the speed of rotation of the platform of said turntable.

6. The welding apparatus as recited in claim 1, further comprising means for varying the speed of movement of said incrementally moving carriage means.

7. The welding apparatus as recited in claim 1, further comprising means for varying the speed and linear distance the welding head is oscillated by said oscillating means.

8. An improved welding apparatus for applying a contiguous coaxial weld bead to a cylindrical surface of a generally cylindrical workpiece having a constant radius of the type having a turntable with a revolving platform with a central axis of rotation, gripper means for supporting the workpiece surface coaxially with the axis of rotation of the platform for rotation therewith, a wire-electrode fed welding torch positionable adjacent the cylindrical workpiece surface for applying a consumable wire-electrode thereto in the form of the weld bead as the workpiece is rotated on the platform, the welding torch includes an elongated welding head which is positionable adjacent the workpiece surface to be welded, supply means for providing the welding head with a supply of wire electrode and a power source to create an electric arc between the wire electrode and workpiece surface, carriage means for supporting the welding torch and for incrementally moving the welding head axially of the workpiece surface, and switch means for energizing the carriage means for incrementally moving the welding head axially of said workpiece surface in response to one complete rotation of the platform and workpiece, wherein the improvement comprises:
  (a) platform pivot means for tilting the platform from a horizontal position through to a vertical position so that the central cylindrical axis of the revolving workpiece is adapted to be angled relative to the horizontal position of the platform;
  (b) oscillating means mountable to the welding head for oscillating the welding head in a horizontally reciprocating linear movement in a generally axial direction of the cylindrical surface such that the weld bead produced by the welding apparatus is skewed in a downwardly angled direction of the workpiece surface by the force of gravity acting thereon, the weld bead thereby having a greater density of weld bead material forming on a downwardly angled side than is formed on an upwardly angled side of the weld bead, the oscillating means spreading out the weld bead on the upwardly angled side of the workpiece creating a generally horizontal surface on the upwardly angled side of the weld bead.

9. An improved welding apparatus as recited in claim 8 in which the platform pivot means and the central axis of the revolving workpiece surface are angled between 30 and 60 degrees with respect to the horizontal position.

10. An improved welding apparatus as recited in claim 9, further comprising gas-shielding means for gas-shielding the electric arc produced by said welding torch.

11. An improved welding apparatus as recited in claim 9, further comprising means for varying the rate of delivery of gas to said gas shielding means.

12. An improved welding apparatus as recited in claim 9, further comprising means for varying the speed of rotation of the platform of said turntable.

13. An improved welding apparatus as recited in claim 9, further comprising means for varying the speed of movement of said incrementally moving carriage means.

14. An improved welding apparatus as recited in claim 9, further comprising means for varying the speed and linear distance the welding is oscillated by said oscillating means.

15. A method of depositing a single layer of a contiguous weld bead material on a cylindrical surface of a generally cylindrical workpiece having a central axis and a constant radius which comprises:
  (a) rotating the workpiece about the central axis of its cylindrical surface;
  (b) tilting the workpiece such that the central axis of the cylindrical surface is angled with respect to a horizontal plane within the range of 30 to 60 degrees;
  (c) supporting a wire-fed welding torch adjacent the cylindrical surface such that as the workpiece is rotated the welding torch deposits weld bead material circumferentially about the cylindrical surface whereby the force of gravity acts to skew the molten weld bead deposit in a downwardly angled axial direction of the cylindrical surface to form a weld bead having a greater amount of material on a downhill side than on an uphill side of the weld bead;
  (d) oscillating the wire-fed welding torch in a reciprocating linear horizontal movement with respect to the angled central axis of the cylindrical surface and in a generally longitudinal direction thereof such that the weld bead produced thereby has a generally horizontal surface portion formed on the uphill side thereof; and
  (e) incrementally moving the welding torch axially with respect to the cylindrical surface to be welded in response to one complete rotation of the cylindrical surface such that weld bead material is uniformly deposited thereon in both the axial and circumferential directions until the entire surface to be welded is covered with a layer of weld bead material.

16. A valve body with a cylindrical surface forming conduit having a central axis therethrough having a layer of weld bead material coating the conduit to provide a corrosion resistent protective coating over the conduit surface of the valve body, said weld bead material being deposited within the conduit of said valve body by a process which comprises:
  (a) rotating the valve body about the central axis of its conduit;
  (b) tilting the valve body such that the central axis of the cylindrical conduit is angled with respect to a horizontal axis within the range of 30 to 60 degrees;
  (c) supporting a wire-fed welding torch adjacent the interior of the cylindrical conduit such that as the valve body is rotated the welding torch deposits weld bead material circumferentially about the conduit surface to be coated whereby the force of gravity acts to skew the molten weld bead deposit in a downhill direction of the cylindrical conduit to form a weld bead having a greater amount of material on a downhill side than on an uphill side of the weld bead;
  (d) oscillating the wire-fed welding torch in a reciprocating linear horizontal movement in a generally longitudinal direction of the cylindrical conduit such that the weld bead produced thereby has a generally horizontal surface portion formed on the uphill side thereof; and
  (e) incrementally moving the welding torch axially with respect to the cylindrical conduit to be coated in response to a complete rotation of the cylindrical surface such that weld bead material is uniformly deposited within the conduit in both the axial and circumferential directions until the entire surface to be coated is covered with a layer of weld bead material.

* * * * *